United States Patent [19]

Peters et al.

[11] Patent Number: 4,798,171
[45] Date of Patent: Jan. 17, 1989

[54] ANIMAL ISOLATOR

[75] Inventors: William F. Peters, Eden Prairie; Randall C. Buchanan, Brooklyn Park, both of Minn.

[73] Assignee: Nu Aire, Inc., Plymouth, Minn.

[21] Appl. No.: 71,414

[22] Filed: Jul. 9, 1987

[51] Int. Cl.⁴ .............................................. A01K 1/03
[52] U.S. Cl. ........................................ 119/15; 55/473
[58] Field of Search ....................... 119/15, 17, 21, 30; 55/473

[56] References Cited

U.S. PATENT DOCUMENTS

| | | | |
|---|---|---|---|
| 3,301,167 | 1/1967 | Howard et al. | 98/115 |
| 3,557,756 | 1/1971 | Ramsey | 119/15 |
| 3,630,174 | 12/1971 | Runkle et al. | 119/15 |
| 3,646,729 | 3/1972 | McKechnie | 55/473 X |
| 3,828,530 | 8/1974 | Peters | 55/473 |
| 3,838,556 | 10/1974 | Finger | 55/473 X |
| 3,870,490 | 3/1975 | Landy | 55/473 X |
| 3,925,043 | 12/1975 | Matrone et al. | 55/473 X |
| 3,926,597 | 12/1975 | Landy | 55/473 X |
| 4,023,529 | 5/1977 | Landy | 119/15 |
| 4,060,025 | 11/1977 | Pelosi, Jr. | 29/428 X |
| 4,098,174 | 7/1978 | Landy | 55/473 X |
| 4,202,676 | 5/1980 | Pelosi, Jr. et al. | 55/482 X |

OTHER PUBLICATIONS

Brochure of Germfree Laboratories, Inc. entitled "Laminar Air for Animal Care".
Brochure of NuAire, Inc. entitled "HEPEX Absolute Filter System".
Brochure of BioClean (a division of Hazleton Systems Incorporated) describing features and specifications of the Duo-Flow portable cleanroom.
Brochure of Lab Products, Inc. (a bioMedic company) describing its See-Through suspended cage system.

Primary Examiner—Robert P. Swiatek
Attorney, Agent, or Firm—Merchant, Gould, Smith, Edell, Welter & Schmidt

[57] ABSTRACT

An animal station is disclosed having a housing defining an interior with first and second openings formed through the housing in air flow communication with the interior. A first filter medium (a prefilter) is disposed to filter particulate matter from air flowing through the first opening and a second filter medium (a HEPA filter) is disposed to filter particulate matter from air flowing through the second opening. The second filter medium is selected to filter particulate matter finer than that filtered by the first filter medium. At least one movable animal cage rack is provided disposed adjacent either of the first and second openings. The rack has an interior providing air flow communication between ambient air and the adjacent opening when the rack is positioned adjacent the housing. A blower is provided for drawing air through an inlet and forcing the air through an outlet. A duct is provided for guiding air flow from the first filter medium to the blower inlet and from the blower outlet to the second filter medium.

8 Claims, 1 Drawing Sheet

ANIMAL ISOLATOR

BACKGROUND OF THE INVENTION

I. Field of the Invention

This invention pertains to animal isolators. More particularly, this invention pertains to an air filtering cabinet with an associated animal rack. The cabinet is used to filter air which is drawn through the animal rack or to filter air prior to its being blown through an animal rack, or both.

II. Description of the Prior Art

Animal isolators (which may alternatively be called animal stations) are widely used in connection with the care, feeding and experimentation with laboratory animals such as rats, rabbits and the like. The purpose of such stations is to protect animals and laboratory personnel from microorganisms which might produce disease or effect results of experimentation. It is also desirable to minimize cross contamination of germs from one animal to another.

An example of an animal station is shown in U.S. Pat. No. 4,023,529 to Landy dated May 17, 1977 (the Landy patent). Such an apparatus is also shown and described in a brochure entitled "LAMINER AIR FOR ANIMAL CARE" of the Germ-Free Laboratories, Inc. which describes the structure and operation of their products Single-Flow Animal Station and Double-Flow Animal Station (having apparent product designation numbers of SFAS-30 and DFAS-60, respectively). As shown in both of these publications, the animal station includes a cabinet having a blower and a filter covering openings form through the cabinet walls. In the Double-Flow Animal Station as shown most clearly in the Germ-Free Laboratories, Inc. brochure, the cabinet includes front and back walls having openings. Covering each of the front and back wall openings are high efficiency particulate air filters (known generally as HEPA filters). In the embodiment shown in the third page of the brochure, the Double-Flow Animal Station is operated at a positive pressure. Namely, the interior of the cabinet is at a higher pressure than ambient air. As a result, air is drawn through a prefilter (designated at numeral 2) through the blower (1) and out through the HEPA filters (3). Animal cages may be positioned exterior of the cabinet on racks positioned adjacent both the front and back walls. This arrangement is shown on the second page of the brochure.

The arrangement shown in the third page of the Germ-Free Laboratories, Inc. brochure, and described above, provides for clean air flow to the animals disposed within the cages adjacent the cabinet walls. Such an arrangement would be desirable where the protection of the animals is the primary concern. However, in laboratory applications, it is commonly desirable to provide for protection of the environment. Namely, with the embodiment shown on the third page of the Germ-Free Laboratories, Inc. brochure, any dust, dander and germs from the animals will be blown in the atmosphere and may be inhaled by laboratory personnel.

Where it is desirable to prevent germs and dander from contaminating the laboratory air, air is drawn through the animal cages and then through the filters. This reverse flow may be referred to as a negative pressure system where the pressure within the chamber is less than the pressure in ambient air. Such an arrangement is shown on the last page of the brochure of Germ-Free Laboratories, Inc.

From time to time, it may be desirable to modify a clean animal station so that it may cause air to flow from a HEPA filter to the animals (positive air flow) or from the room pass the animals to the HEPA filter (negative pressure system). The former is for the protection of the animals and the latter is for the protection of personnel in the lab. With the prior art apparatus, disassembly and reassembly of the filter arrangements may be required. For example, a comparison of the positive and negative pressure systems in the Germ-Free Laboratories, Inc. brochure shows different placement of a prefilter in the two systems. Further, once the direction of air flow through the HEPA filter has been established and the HEPA filter has been used, the system cannot be reversed since reversal of air flow will blow contaminants off of the filter and may lead to injury to either animals or humans.

SUMMARY OF THE INVENTION

According to a preferred embodiment of the present invention, an animal station is provided having a housing which defines an interior having first and second openings exposing the interior in air flow communication with the exterior of the housing. A first filter medium (i.e. a prefilter) is disposed to filter particulate matter from air which flows through the first opening. A second filter medium (i.e. a HEPA filter) is disposed to filter particulate matter from air flowing through the second opening. The second filter medium is selected to filter particulate matter which is finer than that filtered by the first filter medium. An animal cage rack is provided which may be selectively positioned opposing either of the first and second openings. A blower is provided for drawing air from ambient air through the first filter medium to the blower and from the blower outlet to the second filter medium and through the second opening. A duct system is provided for guiding air flow from the suction side of the first filter to the blower inlet. The duct system also guides air from the blower outlet to the pressure side of the second filter.

DESCRIPTION OF THE PREFERRED EMBODIMENT

Figure 1:
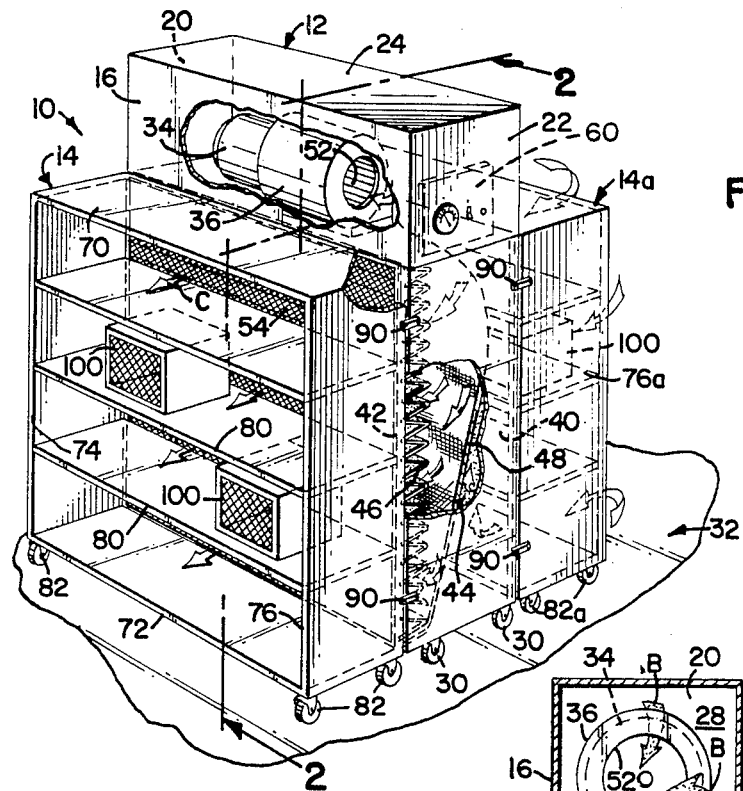
FIG. 1 is a perspective view of an animal station according to the present invention.

Referring now to the figures, an animal station is shown generally at 10. Station 10 includes a housing or cabinet 12 and animal racks 14 and 14a. In the embodiment shown in the figures, two animal racks 14, 14a are shown. However, as will become apparent, animal station 10 could be used for a single animal rack 14. Further, each of racks 14, 14a is identical and a description of one will suffice as a description of the other. Identical elements of the racks 14, 14a are numbered identically with the addition of a suffix "a" to the numbering of the elements of rack 14a.

The cabinet includes front wall 16, back wall 18, end walls 20 and 22, top wall 24 and bottom wall 26. Wall 16, 18, 20, 22, 24 and 26 define an enclosed cabinet interior. A plurality of casters 30 are secured to the exterior of bottom wall 26. As shown in the figures, the walls of the cabinet 12 are disposed such that when the casters 30 are resting on a horizontal surface 32, front wall 16 and back wall 18 are vertical.

Figure 2:
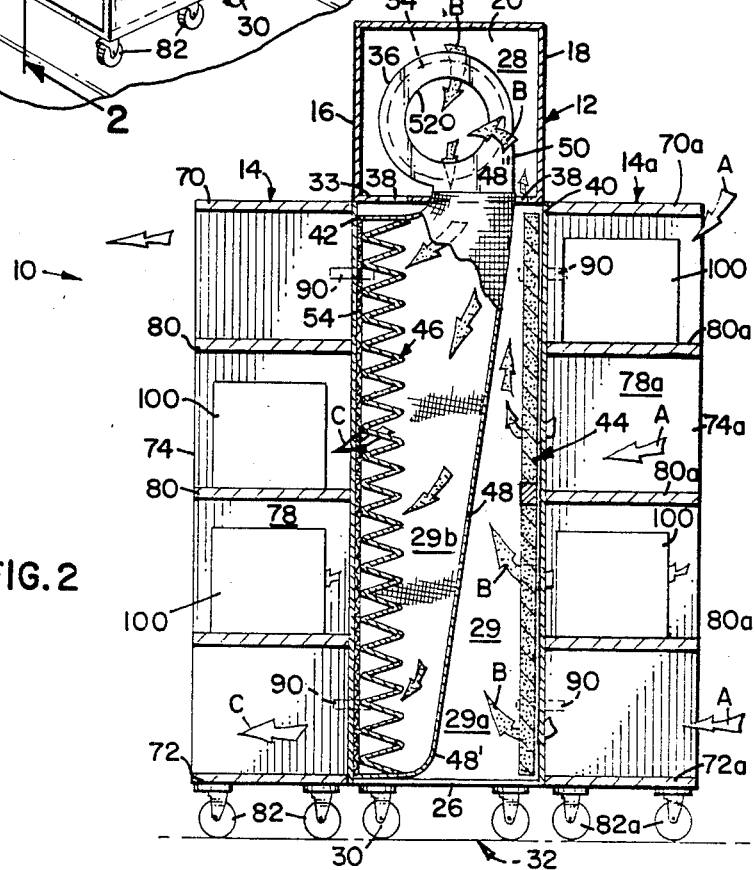
FIG. 2 is a sectional view taken in side elevation of the apparatus taken along line 2—2 of FIG. 1.

Shown best in FIG. 2, an interior dividing wall 33 is provided to act as a mounting platform for a motor 34 and blower 36. Interior dividing wall 33 divides the cabinet interior into upper (or blower) and lower chamber 28 and 29, respectively. The interior dividing wall 33 has a plurality of openings 38 therethrough to provide generally unrestricted air flow communication between the upper and lower chambers 28, 29.

As shown in the figures, dividing wall 33 is provided towards an upper end of the cabinet 12 with the motor 34 and blower 36 disposed at the top of the cabinet 12 within upper chamber 28. It will be appreciated that this is a choice in design and that the motor 34 and blower 36 could be disposed at the bottom of the cabinet 12 which such an embodiment still practicing the teachings of the present invention.

A first opening 40 is formed through back wall 18 and a second opening 42 is formed through front wall 16. As shown in the drawings, openings 40 and 42 are dimensioned such that their width is approximate to the width of front and back walls 16 and 18 with the height of openings 40 and 42 being approximately equal to the distance between bottom wall 26 and interior dividing wall 33 of cabinet 12.

A first filter 44 is disposed covering first opening 40. First filter 44 is a conventional prefilter which preferably comes in the form of a plurality of filter panels mounted in any suitable means to cover first opening 40 such that air passing through first opening 40 is forced to pass through first filter media 44. The first filter 44 is a common prefilter such as panel filters customarily used in residential furnaces. First filter 44 is selected to filter animal fur and dander from the flow of air passing through the filter 44.

A second filter 46 is provided covering second opening 42. Second filter 46 is a high efficiency particulate air filter (commonly known in the art as a HEPA filter). A protective grid 54 is provided over first opening 42 to protect the HEPA filter 46.

The HEPA filter 46 is connected to the blower 36 by means of a plenum or duct 48. While plenum 48 could be of any suitable construction, preferably plenum 48 is a flexible plastic material which has a first end 48' surrounding a periphery of the HEPA filter 46 and has a second end 48" surrounding an outlet 50 of blower 36. An inlet 52 of the blower 36 is disposed within upper chamber 28. A filter having a flexible plenum surrounding the filter with a second end of the plenum surrounding the outlet of a blower is shown by way of example in U.S. Pat. No. 3,828,530.

With the cabinet 12, as described, the blower may be driven by motor 34 to draw air into blower inlet 52 and exhaust the air under pressure through blower outlet 50. The flexible plenum 48 divides lower chamber 29 into two sub-chambers 29a and 29b. Sub-chamber 29a (due to the suction at blower inlet 52) is at a pressure less than ambient air pressure such that air is drawn from ambient air through filter 44 into sub-chamber 29a. The side of filter 44 facing sub-chamber 29a may conveniently be referred to as the suction side of filter 44.

Air flows from sub-chamber 29a through openings 38 into upper chamber 28 and into blower inlet 52. This air is forced under pressure into sub-chamber 29b (sub-chamber 29b is defined by the opposing surfaces of plenum 48). The air within chamber 29b is forced through the HEPA filter 46 and out of opening 42 into atmospheric air. The side of HEPA filter 46 facing the interior of plenum 48 may conveniently be referred to as the pressure side of HEPA filter 46.

With the above described construction, air is subjected to two-stage cleansing. The first is a prefilter cleansing in prefilter 44. The precleaned air then goes through high-efficient filtering through HEPA filter 46. With respect to air contaminants found in an animal laboratory environment, filter 44 filters animal fur and dander while filter 46 will filter germs and other undesirable bacteria.

Any suitable control mechanisms 60 (shown in phantom lines in FIG. 1 and which do not form any part of this invention per se) may be added to control operation of the motor 34 (such as on-off) and to indicate conditions within the cabinet 12 (such as pressure and air flow).

Animal cage racks 14, 14a are generally rectangular in cross-section and include parallel top and bottom walls 70 and 72 joined by parallel vertical side walls 74, 76 to define a rack interior 78. A plurality of horizontal shelves 80 extend between side walls 74, 76. A plurality of casters 82 are secured to the exterior of bottom wall 72 so that the racks 14 may be rolled from place to place as desired.

The racks 14 are dimensioned such that side walls 74, 76 and top and bottom walls 70, 72 surround the periphery of either of openings 40 and 42 when the racks are placed adjacent to cabinet side walls 18, 16, respectively. With the side walls 74, 76 and top and bottom walls 70, 72 surrounding either of openings 40 and 42, the racks 14 are secured to the cabinet 12 in any suitable manner such as by means of attachment clips 90 (the structure of which forms no part of this invention per se). Animal cages 100 may be placed within the interior of the racks on shelves 80 or bottom walls 72.

As shown in FIG. 2, ambient air (indicated by arrow A) flows through the animal cages in rack 14a disposed adjacent opening 40. This air flow is in a direction toward filter 44 and prevents fur, dander and germs of animals within the cages in rack 14a from contaminating lab personnel. The dander and fur in this air flow is separated by filter 44. The prefiltered air (indicated by arrow B) is drawn under suction of blower 36 into plenum 48 and forced through HEPA filter 46. The germs and finer particulate matter are separated by HEPA filter 46. The clean air (indicated by arrow C) from HEPA filter 46 passes through the animal cages disposed within the rack 14 adjacent opening 42. Accordingly, the animals within rack 14 are exposed only to clean air and not contaminated by ambient air within the lab.

The foregoing preferred embodiment illustrates the use of the invention with two racks 14, 14a. This is desirable where one set of cages must be protected from contamination and a second set of cages must be isolated to present them from contaminating the environment.

It will be appreciated that both racks 14 and 14a are not necessary. Rack 14 adjacent opening 42 could be used only in the circumstance where it is desired to protect the animals from germs in ambient air. Rack 14a could be used adjacent opening 40 without the use of rack 14 where it is only desired to protect the lab environment from the animals.

The use of the flexible plenum 48 provides additional protection in that there is a constant negative pressure within chamber 29a so that any air leakage due to the construction of the cabinet 12 results in air being pulled from ambient air into the cabinet. Accordingly, contaminated air within chamber 29a cannot escape into the atmosphere.

From the foregoing detailed description of the present invention, it has been shown how the objects of the invention have been attained in the preferred manner. However, modifications and equivalents of the disclosed concepts, such as readily occur to those skilled in the art, are intended to be included in the scope of this invention. Thus, the scope of the invention is intended to be limited only by the scope of the claims, such as, or may hereafter be, appended hereto.

We claim:

1. An animal station comprising:
   a housing having an interior, said housing having first and second openings therethrough in air flow communication with said interior;
   a first filter medium disposed to filter particulate matter from air flowing through said first opening;
   a second filter medium disposed to filter particulate matter from air flowing through said second opening, said second filter medium selected to filter particulate matter finer than particulate matter filtered by said first filter medium;
   at least one movable animal cage rack, said first and second openings disposed for said at least one rack to be selectively opposing either of said first and second openings when said at least one rack is disposed in a first and second position, respectively, relative to said housing, said at least one rack having an interior providing air flow communication between ambient air and said first and second openings when said at least one rack is in said first and second positions, respectively;
   blower means having a suction inlet and a pressure outlet for drawing air through said suction inlet and blowing air through said pressure outlet;
   motor means for driving said blower means; and
   air flow guide means for guiding air flow from said first filter medium to said blower inlet and from said blower outlet to said second filter medium, said air flow guide means including wall means for defining a first air plenum connecting said first filter medium with said suction inlet and a second air plenum connecting said second filter medium with said pressure outlet.

2. An animal station according to claim 1 wherein said housing includes a first and second spaced apart vertical walls, said first opening formed in said first wall and said second opening formed in said second wall.

3. An animal station according to claim 1 wherein said first filter is selected to remove animal fur and dander from a flow of air and said second filter is a high efficiency particulate air (HEPA) filter.

4. An animal station according to claim 1 wherein said air flow guide means includes a pressure plenum having a first end enclosing said blower outlet and a second end enclosing said second filter and defining an enclosed volume between said blower outlet and said second filter.

5. An animal station according to claim 4 wherein opposing surfaces of said housing, said plenum and said first filter define a volume in air flow communication with an inlet of said blower whereby said volume is maintained at a pressure less than ambient air pressure exterior of said housing.

6. An animal station comprising a filter cabinet having a plurality of walls defining an interior, said plurality of walls including a first vertical wall and a spaced apart second vertical wall having first and second openings therethrough, respectively, in air flow communication with said interior;
   a first filter medium disposed to filter particulate matter from air flowing from said first opening;
   a second filter medium disposed to filter particulate matter from air flowing through said second opening, said second filter medium selected to filter particulate matter finer than particulate matter filtered by said first filter medium;
   said housing including an enclosed blower chamber having a blower disposed within said blower chamber, said chamber in air flow communication with an interior of said housing;
   a pressure plenum connecting an outlet of said blower to said second filter medium with an inlet of said blower maintaining an interior of said housing on a suction side of said first filter medium at a pressure less than ambient pressure exterior of said housing;
   at least one movable animal cage rack sized to abut said housing with an interior of said rack in air flow communication with either of said first opening and said second opening when said at least one rack is disposed in a first and second position, respectively, relative to said housing.

7. An animal station according to claim 6 wherein said first filter is selected to remove animal fur and dander from a flow of air and said second filter is a HEPA filter.

8. An animal station according to claim 6 wherein said plenum has a first end surrounding said second filter and a second end surrounding said blower outlet with said plenum defining a first bounded volume; opposing surfaces of said plenum, housing and first filter defining a second bounded volume in air flow communication with said inlet of said blower.

* * * * *